United States Patent [19]
Alper et al.

[11] Patent Number: 5,910,527
[45] Date of Patent: Jun. 8, 1999

[54] HOT MELT ADHESIVE HAVING A HIGH ACID NUMBER FOR DISPOSABLE SOFT GOODS

[75] Inventors: Mark D. Alper, New Berlin; Diane Strelow, Germantown, both of Wis.

[73] Assignee: Ato Findley, Inc., Wauwatosa, Wis.

[21] Appl. No.: 08/914,523

[22] Filed: Aug. 19, 1997

Related U.S. Application Data

[63] Continuation of application No. 08/559,411, Nov. 5, 1995, abandoned, which is a continuation of application No. 08/234,821, Apr. 28, 1994, abandoned.

[51] Int. Cl.$^6$ .......... C09J 109/06; C09J 125/10; C09J 193/04; C08L 53/02
[52] U.S. Cl. .......... 524/274; 524/270; 524/271; 524/272; 524/505; 525/95; 525/98; 156/327; 156/334
[58] Field of Search ............ 525/98, 95; 427/208.2, 427/208.4; 524/270, 274, 505, 271, 272; 156/327, 334

[56] References Cited

U.S. PATENT DOCUMENTS

| | | | |
|---|---|---|---|
| 3,956,223 | 5/1976 | Chiang et al. | 525/98 |
| 4,476,180 | 10/1984 | Wnuk | 428/220 |
| 4,477,613 | 10/1984 | Evans et al. | 524/77 |
| 4,654,389 | 3/1987 | Graham et al. | 524/27 |
| 4,714,728 | 12/1987 | Graham et al. | 524/272 |
| 4,714,735 | 12/1987 | Hodgson | 524/514 |
| 4,785,043 | 11/1988 | Kawai et al. | 524/272 |
| 4,835,200 | 5/1989 | St. Clair | 524/100 |
| 4,895,567 | 1/1990 | Colon et al. | 524/271 |
| 4,977,014 | 12/1990 | Mitchell et al. | 428/220 |
| 5,149,741 | 9/1992 | Alper | 525/95 |

OTHER PUBLICATIONS

ASTM D465–82–Standard Test Methods for Acid Number of Rosin.
ASTM D1994–91–Standard Test Method for the determination of acid numbers for Hot Melt Adhesives.

*Primary Examiner*—Mark L. Warzel
*Attorney, Agent, or Firm*—Andrus, Sceales, Starke & Sawall

[57] ABSTRACT

A hot melt construction adhesive having a high acid number and which possesses superior properties for the construction of disposable soft goods. The adhesive composition includes an A-B-A block copolymer; a resin; a compatible mineral oil; and an antioxidant; and wherein the hot melt construction adhesive has a viscosity of less than 10,000 cP at 325° F., a melting point of less than 190° F., and an acid number of greater than 30.

11 Claims, No Drawings

HOT MELT ADHESIVE HAVING A HIGH ACID NUMBER FOR DISPOSABLE SOFT GOODS

This application is a continuation of application Ser. No. 08/559,411, filed Nov. 5, 1995, now abandoned, which is a continuation of application Ser. No. 08/234,821, filed Apr. 28, 1994, now abandoned.

SPECIFICATION

1. Field of the Invention

The present invention relates to hot melt construction adhesives having a high acid number and which find particular utility in the construction of disposable soft goods, and more specifically, to a hot melt adhesive composition which is particularly useful in binding selected substrates utilized in the construction of disposable soft goods to synthetic films which have component elements which bloom to their exterior facing surfaces and which subsequently interfere with or impede the formation of an adhesive bond.

2. Background of the Invention

The prior art is replete with numerous examples of hot melt adhesives which are employed for the construction of disposable soft goods. Specific applications for these prior art adhesives have included disposable diapers, sanitary napkins, surgical drapes, hospital pads and many other utilitarian objects. An example of a suitable hot melt adhesive for use in the construction of disposable soft goods is found in U.S. Pat. No. 5,149,741 to Alper et al., and which is incorporated by reference herein.

The hot melt construction adhesives disclosed in the Alper patent relate to multi-purpose adhesive compositions, and more specifically to those adhesives which find usefulness in bonding various substrates together and which are utilized in disposable soft goods. The adhesive applications for these multi-purpose adhesives include bonding a polyethylene substrate to the nonwoven portion and absorbent pad, and on some diapers, this same adhesive also bonds a colored film in place at the end seals. Further, this same adhesive may also be used for elastic attachment, that is, bonding the elastic material to the polyethylene in either the leg and/or waist area. Additionally, these same adhesives are often used in landing strips, that is, bonding a reinforcing layer of polyolefin film to the polyethylene in the area opposite the tape tabs, and for use as a core adhesive, that is, applying an adhesive to the absorbent core to increase the strength of the core.

As should be understood, manufacturers of disposable soft goods and other products such as flexible packaging have often encountered problems in assembling these goods when utilizing specific types of elastomeric as well as other synthetic films and foams. As should be understood, these types of synthetic films and foams are often used, in various amounts, in the construction of various consumer products such as diapers, incontinent products, feminine care products, disposable medical and industrial garments and all manner of flexible packaging. These same films typically are manufactured from A-B-A block copolymers such as styrene-butadiene-styrene (SBS), styrene-isoprene-styrene (SIS), as well as special polyolefins such as, but not limited to, ethylene vinyl acetate (EVA), and very low density polyethylene (LDPE).

For example, elastomeric film compositions, such as what are described above, include about 20% to about 80%, by weight, of the elastomeric block copolymers, and about 20% to about 80% by weight, of other polyolefins, or ethylene vinyl acetate. An example of these films and the specifics of their composition can be found in U.S. Pat. No. 4,476,1800 Normally, when these elastomeric films are formulated and then extruded, the films are very tacky, and thus very difficult to process on the extrusion line, and in the subsequent converting eguipment. To address the problems attendant to the tackiness of this elastomeric film, manufacturers of these films normally incorporate relatively high amounts of slip agents into their film formulations. These slip agents are typically fatty acid amides and they generally have the formula $CH_3$—R—CO—$NH_2$. In this case, the letter R is a chain of repeating —$CH_2$— units. They are also typically about 12 to 24 carbon atoms in length. The most commonly used fatty acid amide is Erucamide. It is commercially available under the tradename Kemamide E from the Humko-Sheffield Chemical Company. In particular, this slip agent has a carbon chain which is 22 units long, has a molecular weight of about 335, and further has a capillary melting point of about 82° C.

While these specific elastomeric and other synthetic films and foams have operated with varying degrees of success, they have several shortcomings which have detracted from their usefulness. More specifically, the slip agents incorporated into these films have caused significant problems when prior art adhesives have been applied thereto. In particular, it is believed that the slip agents become mobile, under specific environmental circumstances, or are otherwise incompatible with the polymers used in these films, and these two factors combine, in various degrees, to cause the slip agents to migrate to, or otherwise to become deposited on, or "bloom" to, the exterior surface of the film. Inasmuch as these slip agents have a waxy nature, once they bloom to the surface of the film, they act as lubricants. For the manufacturers of these films this provides two valuable benefits. The first benefit derived from this deposit is that the presence of this waxy layer on the exterior surface of the film helps prevent adjacent layers of film from adhering together (or which as known in the industry as "blocking") when it is placed into a roll form. The second benefit of these deposits is that, as noted above, it acts as a lubricant thereby facilitating the use of the film when it is unwound and then sent past rollers and guides during the production or converting process.

While the slip agents referred to above facilitate and even enhance the use of these synthetic films in manufacturing, these same slip agents which migrate to the exterior surface of the film appear to destroy, or substantially weaken the bond of prior art adhesives which are applied thereto. The amount of slip agent present in the films currently in commercial production ranges from about 0.1% to 1% by weight, although some films which are currently in production have as much as 4.5%, by weight, of slip agent present. A further disclosure of the use of slip agents in films which are of the type described above can be found in U.S. Pat. Nos. 4,476,180, 4,977,014, and 4,714,735 all of which are incorporated by reference herein.

In view of the difficulty surrounding the application of hot melt adhesives to elastomeric and other types of films and foams such as what is described above, the industry has long sought after a hot melt adhesive composition which would bind these specific flexible films to other substrates while simultaneously avoiding the detriments associated with the prior art adhesives which have been utilized for substantially identical purposes.

4. Objects and Summary of the Invention

It is therefore an object of the present invention to provide an improved hot melt construction adhesive which has a high acid number, and which further is uniquely well suited for binding substrates to films which have slip, or anti-blocking agents which bloom to, or are otherwise deposited on the exterior surface thereof.

Another object of the present invention is to provide a hot melt construction adhesive which can be applied by utilizing either extrusion, or spray techniques to join or otherwise adhere a film to at least one other substrate which may include polyolefins, or nonwovens, or a combination of one film to at least one other substrate which may include polyolefins, nonwoven, or a combination of one elastic polyolefin or nonwoven substrate.

Another object of the present invention is to provide a hot melt construction adhesive which has a composition including:
about 15% to about 30%, by weight, of an A-B-A block copolymer, and wherein the A block is styrene and the 3 block includes isoprene or butadiene;
about 20% to about 65%, by weight, of a suitable resin;
about 10% to about 30%, by weight, of a compatible mineral oil; and
about 0.1% to about 3%, by weight, of an antioxidant and wherein the hot melt construction adhesive has a viscosity of less than 10,000 centipoise at 325° F., a melting point of less than about 190° F., and an acid number of not less than 25.

Another object of the present invention is to provide a hot melt construction adhesive which may be employed as a multi-purpose hot melt adhesive for disposable soft good production, and which further can be formulated by utilizing A-B-A block copolymers which have varying amounts of styrene and various coupling efficiency rates.

Another object of the present invention is to provide a hot melt construction adhesive and wherein the adhesive has a resin component which is selected from the group of resins which includes pentaerythritol esters of tall oil rosin; polymerized tall oil rosin; and fumaric acid modified pentaerythritol esters of tall oil rosin.

A further object of the present invention is to provide a hot melt construction adhesive which produces relatively strong bonds and which further does not degrade when exposed to an environment which facilitates the blooming or deposit of slip or other anti-blocking agents on the exterior surface of the film.

Further objects and advantages are to provide a hot melt construction adhesive for the purposes described and which is durable, easy to apply, and which further does not possess the numerous shortcomings which are attributable to the prior art adhesives which are utilized for the same or similar purposes.

DESCRIPTION OF THE PREFERRED EMBODIMENT

The hot melt construction adhesives of the present invention and which are utilized for binding a substrate to a film which has an anti-blocking or slip agent incorporated therein and which blooms to the surface thereof includes,
about 15% to about 30% by weight of an A-B-A block copolymer and wherein the A block is styrene and the B block includes isoprene or butadiene;
about 20% to about 65%, by weight, of a suitable resin;
about 10% to about 30%, by weight, of a compatible mineral oil; and
about 0.1% to about 3%, by weight, of an antioxidant, and wherein the hot melt adhesive has a viscosity of less than 10,000 centipoise at 325° F., a melting point of less than 190° F., and an acid number of not less than 25.

The A-B-A block copolymer component of the hot melt construction adhesive of the present invention may be one of two specific classes, (a) an unvulcanized elastomeric block copolymer wherein the respective monomeric moieties are arranged in an alternating sequence having the general configuration S-I-S or S-B-S as the case may be. In this first case, S is a nonelastomeric block derived from styrene and the I, or B is an elastomeric polymer block derived from isoprene or butadiene. In the preferred embodiment, the total concentration of styrene in the block copolymer appears to be noncritical, that is, A-B-A block copolymers having as little as 18% styrene, and greater than 25% styrene have been used with equal success. Further, the coupling efficiency rates of the A-B-A block copolymer also appear non-critical, that is, polymer sources have been used where the coupling efficiency of the A-B-A block copolymer is as low as 60% with no apparent deleterious consequences being evident. Suitable styrene-isoprene-styrene block copolymers for use herein are commercially available from Shell Chemical Company under the trade designation Kraton 1125, and Kraton 1113X, respectively; and (b) a teleblock copolymer comprising molecules having at least three branches radially branching out from a central hub, each of the branches having polystyrene terminal blocks, and an isoprene segment in the center. This type of block copolymer may also be described as having a branched polymerized isoprene or butadiene midblock with a polystyrene terminal block at the end of each branch.

It should also be recognized that mixtures of the above block copolymers may also be used as the copolymer element in adhesive compositions of the present invention.

The resin which is utilized in the adhesive compositions of the present invention are those which are selected from the group which include pentaerythritol esters of tall oil rosins; polymerized tall oil rosin; and fumaric acid modified pentaerythritol esters of tall oil rosins. Suitable rosins may be purchased commercially from the Arizona Chemical Company under the trade designations Sylvatac 2100, 2110, and 295, respectively; and XR4083 and XR4163, respectively. In this regard, it should be understood that Sylvatac 2100 and 2110 are both pentaerythritol esters of tall oil rosin. The only seemingly relevant physical difference between these two materials are their melting points, that is, Sylvatac 2100 has a ring and ball melting point of 100° C. while Sylvatac 2110 has a a melting point of 108° C. Both of these specific resins have acid numbers in the range of about 6 to 12. Further, Sylvatac 295 is a polymerized tall oil rosin with a melting point of 95° C., and an acid number of about 140. Additionally, XR4083 and XR4163 are disclosed by the manufacturer as fumaric acid modified pentaerythritol esters of tall oil rosin. In this regard, the XR-4083 has a ring and ball melting point of about 95° C., while the XR-4163 has a melting point of about 85° C. Both of these resin materials have an acid number of about 60 to 70. Acid numbers for the rosins noted above, as well as the hot melt construction adhesive disclosed herein, were determined by utilizing ASTM test procedure D465-82 and which relates to the Standard Test Method for Acid Number of Rosin; and ASTM D1994-91 and which is entitled Standard Test Method for the Determination of Acid Numbers of Hot Melt Adhesives. Both of these test methods and their related documentation are incorporated by reference herein. In the present invention, it has been found that the acid number of the resulting hot melt adhesive composition should be greater than 25 in order to effectively bond to the various films, which were earlier described.

The present invention includes about 10% to about 30%, by weight, of a compatible mineral oil; as well as about 0.1% to about 3%, by weight, of an appropriate antioxidant. In this regard, the applicants have employed in the examples which follow white mineral oil which may be purchased commercially from Witco Chemical Company under the trade designation Kaydol. Further, it should be understood that other plasticizing oils or extending oils may also be substituted in place of the mineral oil within the same ranges noted above, and which will operate to provide the desired wetting action or viscosity control similar to that provided by the mineral oil, Kaydol. Examples of these substitute materials include, but are not limited to, olefin oligomers and low molecular weight polymers such as vegetable and animal oil and derivatives of such oils.

The stabilizers which are utilized in the hot melt construction adhesive of the present invention are incorporated to help protect the otherwise vulnerable S-I-S or S-B-S block copolymers, and thereby the total adhesive composition, from the deleterious thermal and oxidative degradation which is frequently experienced by other similar copolymers during the manufacture and application of adhesive compositions utilizing same, as well as in the ordinary use of the final manufactured product. As should be understood, such degradation usually manifests itself by the deterioration of the adhesive composition in appearance, physical properties and performance. Among the most useful stabilizers are high molecular weight hindered phenols and multi-functional phenols such as sulfur, and phosphorous-containing phenols. In this regard, hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group is believed to retard its stretching frequency and corresponding, its reactivity. This steric hindrance is believed to provide the phenolic compounds with its stabilizing properties. Representative hindered phenols include:

1,3,5-trimethyl-2,4,6-tris(3-5-ditert-butyl-4-hydroxybenzyl) benzene;
pentaerythritol tetrakis-3(3,5-di-tert-butyl-4-hydroxyphenyl) propionate;
n-octadecyl-3 (3,5-di tert-butyl-4-hydroxphenyl) propionate;
4,4'-methylenebis (4-methyl-6-tert butylphenol);
4,4'-thiobis(6-tert-butyl-o-cresol);
2,6-di-tert-butylphenol;
6-(4-hydroxyphenoxy)-2,4(bis(n-ocytlthio)-1,3,5-triazine;
2,4,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-ditert-butyl-4-hydroxy-benzoate; and
sorbitol hexa-(3,3,5-di-tert-butyl-4-hydroxy-phenyl) propionate).

Especially preferred as a stabilizer is pentaerythritol tetrakis-3(3, 5-di-tert-butyl -4 hydroxyphenyl) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediaminetetraacetic acid, salts thereof, and disalicylapropylenedimine.

The hot melt construction adhesive compositions of the present invention may be formulated using any of the techniques known in the art. A representative example of the prior art procedure involves placing all of the oil and stabilizer substances in a jacketed mixing kettle, and preferably in a jacketed heavy duty mixer of the Baker-Perkins or Day type, and which is equipped with rotors, and thereupon raising the temperature of this mixture to a range of from about 250 degrees to 350 degrees F. As should be understood, the precise temperature to be used in this step will depend upon the melting point of the particular ingredients. When the initial mixture, noted above, has been heated, the mixture is blanketed in $CO_2$ at a slow flow rate and the resins described above are slowly added. When the resins are melted, and at the desired temperature, the block copolymer is added to the mixture. The resultant adhesive composition mixture is agitated until the block copolymer is completely dissolved. A vacuum is then applied to remove any entrapped air.

Optional additives may be incorporated into the hot melt construction adhesive compositions in order to modify particular physical properties. These additives may include, colorants, such as titanium dioxide, and fillers such as talc and clay, etc.

The invention is further illustrated by way of the several examples which follow.

Example 1

An adhesive composition made in accordance with the teachings of the present invention was formulated by the general procedure described above. This adhesive composition had the following constituent elements:

about 25%, by weight, of a Styrene Isoprene Styrene block copolymer; Shell Chemical Company, Kraton 1125, 25% styrene, by weight;

about 60%, by weight, of a pentaerythritol ester of a tall oil rosin; Arizona Chemical Company, Sylvatac 2100 and 295, supplied in equal amounts by weight.

about 14%, by weight, of a compatible mineral oil, Witco Chemical Company, Kaydol; and about 1% by weight of a hindered phenolic antioxidant; CIBA-Geigy Company; Irganox 1010.

The resulting hot melt construction adhesive, upon testing was found to be useful in binding to films having Erucamide as a slip agent, and was further, found to not delaminate even following exposure to environmental conditions which facilitated or enhanced the migration of Erucamide to the exterior surface of the film. Additionally, this adhesive composition was found to have a viscosity of approximately 2,600 cP at 325° F.; a melting point of approximately 188° F. when measured by the ring and ball method; and acid number of 48.

Example 2

A hot melt adhesive made in accordance with the teachings of the present invention and which was found especially useful for the purposes described, was made by the general procedure described earlier. Further, this adhesive composition had the following constituent elements:

about 22.5%, by weight, of a S-I-S block copolymer; Shell Chemical Company; Kraton 1125 (25%, by weight, of styrene);

about 57.5%, by weight, of a fumaric acid modified pentaerythritol ester of a tall oil rosin, Arizona Chemical Company, XR 4083;

about 19%, by weight, of a white mineral oil; Witco Chemical Company, Kaydol; and about 1%, by weight, of a hindered phenolic antioxidant, CIBA-Geigy Co.; Irganox 1010.

Following testing of the adhesive composition, set forth above, it was found to be a superior adhesive composition for attachment of various substrates to the films, earlier described. Additionally, the adhesive composition of the second example had a viscosity of 1,800 cP at a temperature of 325° F.; a ring and ball melting point of 183° F.; and an acid number of about 34.5.

Example 3

A hot melt adhesive of the present invention was made in accordance with the teachings, noted above, and was found particularly useful when applied to films having the anti-blocking or slip agents, earlier described. This adhesive composition had the following constituent elements:

about 25%, by weight, of an S-I-S block copolymer; Shell Chemical Company, Kraton 1113X, (18% styrene);

about 57.5%, by weight, of a fumaric acid modified pentaerythritol ester of a tall oil rosin, Arizona Chemical Company, XR-4083;

about 17.5%, by weight, of a compatible white mineral oil; Witco Chemical Company, Kaydol; and about 1%, by weight, of a hindered phenolic antioxidant; Ciba-Geigy Company; Irganox 1010.

Following testing, the adhesive composition set forth above was found to be superior in adhering to the films earlier described. More specifically, the adhesive had a viscosity of 3,800 cP at 325° F.. and a ring ball melting point of 168° F. Further, the adhesive composition had an acid number of 34.5.

Example 4

A hot melt adhesive composition in accordance with the teachings of the present invention and which was found useful for attaching various substrates to the films earlier described was formulated with the following constituent elements:

about 25%, by weight, of an S-I-S block polymer, Shell Chemical Company, Kraton 1125% (25% styrene);

about 60%, by weight, of a fumaric acid modified pentaerythritol ester of a tall oil rosin; Arizona Chemical Company, XR 4163;

about 14%, by weight, of a white mineral oil; Witco Chemical Company, Kaydol; and about 1%, by weight, of a hindered phenolic antioxidant; CIBA-Geigy Company; Irganox 1010.

Following comparative testing against other prior art adhesives, this adhesive composition was also found to be superior in binding various substrates to the films, earlier described. More specifically, this adhesive composition possessed a viscosity of approximately 2,500 cP at 325° F., and a melt point measured by the ring and ball method of 180° F. The adhesive composition of the present example had an acid number of about 36.

Therefore, it will be seen that the improved hot melt adhesive of the present invention provides a dependable and practical means for adhesively assembling a disposable soft good such as disposable diapers, feminine napkins, and the like and which further avoids the detriments associated with the prior art practices which includes, among others, employing several different adhesive compositions for assembling a disposable soft good. In addition to the foregoing, the improved hot melt adhesive composition bonds effectively to elastomeric films which have the anti-blocking or slip agents earlier described while simultaneously maintaining desirable manufacturing viscosities and melt points which are within acceptable manufacturing ranges.

It will be apparent to those skilled in the art that the foregoing examples have been made for purposes of illustration, and that variations may be made in proportions, procedures, and material without departing from the scope of the present invention. Therefore, it is intended that this invention not be limited except by way of the claims which follow.

Having described our new invention, what we claim as new and desire to secure by letters patent is:

1. A hot melt adhesive composition for binding a first substrate to a second substrate, and wherein one of the substrates includes an anti-blocking agent which blooms to the exterior surface thereof, the hot melt adhesive composition consisting essentially of:

about 15% to about 30% by weight of an A-B-A block copolymer, and wherein the A block is styrene and the B block includes isoprene;

about 20% to about 65% by weight of resin, said resin comprising a fumaric acid modified pentaerythritol ester of tall oil rosin;

about 10% to about 30% by weight of a compatible mineral oil; and about 1 to about 3% by weight of an anti-oxidant and wherein the hot melt adhesive has a viscosity of less than 10,000 cP at 325° F., a melting point of less than 190° F., and an acid number of about 30 to about 80.

2. A hot melt adhesive composition as claimed in claim 1, and wherein the amount of styrene, by weight, in the A-B-A block copolymer is less than 30%, and wherein the coupling efficiency of the A-B-A block copolymer is greater than 50%.

3. A hot melt adhesive composition as claimed in claim 1, and wherein the anti-blocking agent is a slip agent which includes a fatty acid amide.

4. A hot melt adhesive composition for binding a first substrate to a second substrate, and wherein one of the substrates includes an anti-blocking agent which blooms to the exterior surface thereof, the hot melt adhesive composition consisting essentially of:

about 25%, by weight, of a styrene-isoprene-styrene block copolymer;

about 60%, by weight, of a compatible resin said resin comprising a fumaric acid modified pentaertitol ester of tall oil rosin;

about 14%, by weight, of a compatible mineral oil; and about 1%, by weight, of an antioxidant, and wherein the hot melt adhesive composition has a viscosity of less than 3,000 cP at 325° F., a melting point of less than 190° F., and an acid number of about 30 to about 80.

5. A hot melt adhesive composition as claimed in claim 4 and wherein the styrene-isoprene-styrene block copolymer has about 25%, by weight, of styrene, and wherein the compatible mineral oil is a white mineral oil, and wherein the acid number of the resulting hot melt adhesive composition is about 48.

6. A hot melt adhesive composition for binding a first substrate to a second substrate, and wherein one of the substrates includes an anti-blocking agent which blooms to the exterior surface thereof, the hot melt adhesive composition consisting essentially of;

about 22.5%, by weight, of a styrene-isoprene-styrene block copolymer;

about 57.5%, by weight, of a resin said resin comprising a fumaric acid modified pentaer thritol ester of tall oil resin;

about 19%, by weight, of a compatible mineral oil; and about 1%, by weight, of a compatible antioxidant, and wherein the hot melt adhesive composition has a viscosity of less than 2,000 cP at 325° F., a melting point of less than 190° F., and an acid number of about 30 to about 80.

7. A hot melt adhesive composition as claimed in claim 6, and wherein the styrene-isoprene-styrene block copolymer has about 25%, by weight, of styrene, and wherein the anti-blocking agent is a slip agent which includes a fatty acid amide.

8. A hot melt adhesive composition for binding a first substrate to a second substrate, and wherein one of the substrates includes an anti-blocking agent which blooms to the exterior surface thereof, the hot melt adhesive composition consisting essentially of:

about 25%, by weight, of a styrene-isoprene-styrene block copolymer;

about 57.5%, by weight, of a resin said resin comprising a fumaric acid modified pentaer ritol ester of tall oil resin;

about 16.5% by weight, of a compatible mineral oil; and about 1% by weight, of a compatible antioxidant, and wherein the hot melt adhesive composition has a viscosity of less than 4,000 cP at 325° F., a melt point of less than 190° F., and an acid number of about 30 to about 80.

9. A hot melt adhesive composition as claimed in claim 8, and wherein the styrene-isoprene-styrene block copolymer has about 68%, by weight, of styrene, and wherein the anti-blocking agent is a slip agent which includes a fatty acid amide.

10. A hot melt adhesive composition for binding a first substrate to a second substrate, and wherein one of the substrates includes an anti-blocking agent which blooms to the exterior surface thereof, the hot melt adhesive composition consisting essentially of:

about 25%, by weight, of a styrene-isoprene-styrene block copolymer;

about 60%, by weight, of a resin, said resin comprising a fumaric acid modified pentaerythritol ester of tall oil resin;

about 14%, by weight, of a compatible mineral oil; and about 1%, by weight, of a compatible antioxidant, and wherein the hot melt adhesive composition has a viscosity of about 2,500 cP at 325° F., a melting point of about 180° F., and an acid number of about 30 to about 80.

11. A hot melt adhesive composition as claimed in claim 10, and wherein the styrene-isoprene-styrene block copolymer has about 25%, by weight, of styrene, and wherein the anti-blocking agent is a slip agent, which includes a fatty acid amide.

* * * * *

UNITED STATES PATENT AND TRADEMARK OFFICE
CERTIFICATE OF CORRECTION

PATENT NO. : 5,910,527
DATED : June 8, 1999
INVENTOR(S) : Mark D. Alper et al

It is certified that error appears in the above-identified patent and that said Letters Patent is hereby corrected as shown below:

IN THE CLAIMS:

| | |
|---|---|
| Claim 1, col. 8, line 24 (Claim 1, line 9, Amendment dated 10-01-98) | Delete "1" and substitute therefor ---.1--- |
| Claim 4, col. 8, line 43 (Claim 5, line 5, Amendment dated 10-01-98) | After the first occurrence of the word "resin" insert ---,--- |
| Claim 4, col. 8, line 44 (Claim 5, line 6, Amendment dated 10-01-98) | Delete "pentaertitol" and substitute therefor ---pentaerythritol--- |
| Claim 6, col. 8, line 65 (Claim 8, line 5, Amendment dated 10-01-98) | After the first occurrence of the word "resin" insert ---,--- |

UNITED STATES PATENT AND TRADEMARK OFFICE
CERTIFICATE OF CORRECTION

PATENT NO. : 5,910,527
DATED : June 8, 1999
INVENTOR(S) : Mark D. Alper et al

It is certified that error appears in the above-identified patent and that said Letters Patent is hereby corrected as shown below:

| | |
|---|---|
| Claim 6, col. 8, line 66 (Claim 8, line 6, Amendment dated 10-01-98) | Delete "pentaer thritol" and substitute therefor ---pentaerythritol--- |
| Claim 8, col. 9, line 19 (Claim 11, line 5, Amendment dated 10-01-98) | After the first occurrence of the word "resin" insert ---,--- |
| Claim 8, col. 9, line 20 (Claim 11, line 6, Amendment dated 10-01-98 | Delete "pentaer ritol" and substitute therefor ---pentaerythritol--- |

Signed and Sealed this

First Day of February, 2000

Attest:

Attesting Officer

Q. TODD DICKINSON

Acting Commissioner of Patents and Trademarks